United States Patent
Rougnon-Glasson

(10) Patent No.: US 7,185,125 B2
(45) Date of Patent: Feb. 27, 2007

(54) DEVICE FOR TRANSFERRING DATA VIA WRITE OR READ POINTERS BETWEEN TWO ASYNCHRONOUS SUBSYSTEMS HAVING A BUFFER MEMORY AND PLURALITY OF SHADOW REGISTERS

(75) Inventor: Nicolas Rougnon-Glasson, Grenoble (FR)

(73) Assignee: STMicroelectronics S.A., Montrouge (FR)

( * ) Notice: Subject to any disclaimer, the term of this patent is extended or adjusted under 35 U.S.C. 154(b) by 181 days.

(21) Appl. No.: 10/743,564

(22) Filed: Dec. 22, 2003

(65) Prior Publication Data

US 2004/0230723 A1    Nov. 18, 2004

(30) Foreign Application Priority Data

Dec. 23, 2002    (FR) .................................. 02 16491

(51) Int. Cl.
  *G06F 3/00*    (2006.01)
  *G06F 9/44*    (2006.01)
  *G06F 12/00*   (2006.01)
  *G06F 12/56*   (2006.01)

(52) U.S. Cl. ........................ 710/52; 710/50; 710/51; 710/57; 710/267; 712/225; 712/228

(58) Field of Classification Search ............ 710/50–52, 710/57, 267; 712/225, 228
See application file for complete search history.

(56) References Cited

U.S. PATENT DOCUMENTS

| | | | | |
|---|---|---|---|---|
| 4,873,703 A | | 10/1989 | Crandall et al. ............ 375/118 |
| 5,471,583 A | * | 11/1995 | Au et al. ....................... 710/57 |
| 6,128,728 A | * | 10/2000 | Dowling ..................... 712/228 |
| 6,145,049 A | * | 11/2000 | Wong .......................... 710/267 |
| 2002/0069375 A1 | | 6/2002 | Bowen ......................... 713/400 |
| 2003/0023836 A1 | * | 1/2003 | Catherwood et al. ....... 712/225 |
| 2003/0028756 A1 | * | 2/2003 | Panis et al. ................. 712/225 |

FOREIGN PATENT DOCUMENTS

| EP | 1 039 371 A1 | 9/2000 |
|---|---|---|
| GB | 2 373 595 A | 9/2002 |

* cited by examiner

*Primary Examiner*—Tammara Peyton
(74) *Attorney, Agent, or Firm*—Lisa K. Jorgenson; Robert Iannucci; Seed IP Law Group PLLC

(57) ABSTRACT

Device for transferring data between two asynchronous systems communicating via a FIFO memory. The first system comprises a write pointer register and the second system comprises a read pointer register to the FIFO. Each pointer register is associated with a primary shadow register and a secondary shadow register. The primary shadow register is located in the same sub-assembly as the pointer register with which it is associated, and episodically receives a copy of this pointer register. The secondary shadow register is located in the other sub-assembly, and episodically receives a copy of the primary shadow register. Thus, each system has its own pointer register, its associated primary shadow register, and the secondary shadow register associated with the pointer register of the other system.

24 Claims, 6 Drawing Sheets

DEVICE FOR TRANSFERRING DATA VIA WRITE OR READ POINTERS BETWEEN TWO ASYNCHRONOUS SUBSYSTEMS HAVING A BUFFER MEMORY AND PLURALITY OF SHADOW REGISTERS

BACKGROUND OF THE INVENTION

1. Field of the Invention

The present invention relates to electronic circuits and more particularly to a device for transferring data between two asynchronous subsystems comprising a buffer storage.

2. Description of the Related Art

Many electronic circuits comprise independent sub-assemblies that are clock-actuated by absolutely asynchronous clocks. It is the case when, for example, a high-speed processor processes data and then needs to communicate with a lower speed system. There may be no relation between the phases of both system clocks compared to each other. This can even be the case within a single semiconductor circuit where two absolutely independent different subsystems clock-actuated by absolutely asynchronous clocks are arranged.

Techniques are well known that allow communication between asynchronous systems.

FIG. 1 illustrates a traditional technique, based on a transmit flag that accompanies data transmission from a system 100 to a system 150.

To this end, in sub-assembly 100, data transfer is organized from an input 101 (next_data) to a register 102 via a multiplexer 103 that is controlled by a control signal 114 (tx_send). The transmit flag tx_flag is generated by means of an XOR gate 104 and a flip-flop 105 ensuring a change of state for each new transmitted data.

On the other side, in receive subcircuit 150, flag signal tx_flag is received on the input of a flip-flop 151, and is then transmitted to an input of a second flip-flop 152 and finally to a third flip-flop 153. The respective outputs of flip-flops 152 and 153 (rx_flag) are used by an XOR gate 154 in order to generate a control signal (rx_receive) ensuring the transfer of received data (tx_data) to a register 156 via a multiplexer 157.

The major disadvantage of this first known system lies in the fact that the receive clock must be sufficiently fast to ensure reception of the data transmitted by sub-assembly 100. Otherwise, it results in data loss. More particularly, there must be two rising edges of clock signals of the receiving subsystem 150 between two successive switches of signal tx_flag. Thus, receive speed must be much higher than transmit speed. In particular, sub-assembly 150 that receives data does not have any possibility of slowing down the information stream transmitted by sub-assembly 100. Generally, such a structure can operate only for low transmit speeds.

FIG. 2 more particularly illustrates chronograms representative of the operation of the system described in FIG. 1, and in particular transmit signals tx_clk, tx_send, tx_flag and tx_data and, receive signals rx_clk, rx_flag, rx_receive and rx_data.

In order to slow down transmission of transmit information when that proves to be necessary, the receive sub-assembly can be equipped with a handshake mechanism. Such a technique is illustrated in FIG. 3: Sub-assembly 200 comprises, like previously, a register 202 for receiving the data presented to a circuit 201 and transmitted via a multiplexer 203 under control of signal tx_send. This signal tx_send is used to control a multiplexer 204 whose output is connected to a flip-flop 205 generating transmit flag tx_flag. A flip-flop 206 is connected in cascade with a flip-flop 207, which flip-flop has an output connected to a first switching input of multiplexer 204 and to a first input of an XOR gate 208. A second input of multiplexer 204 receives the transmit flag output from flip-flop 205. Gate XOR 208 outputs a signal tx_dont_send that is used to stop transmission of data.

On the receive side, transmit flag tx_flag is transmitted via a cascade of flip-flops 251 and 252 (switching according to the clock of subsystem 250) to a flip-flop 253 and to a first input of an XOR gate 254. Flip-flop 253 generates a second flag rx_flag that is transmitted, on the one hand, to the input of flip-flop 206 in subsystem 200 and, on the other hand, to a second input of gate XOR 254 controlling a multiplexer 255. This multiplexer allows the transfer of data received from sub-assembly 200 to a register 256, which register outputs data rx_data on a circuit 257.

As can be seen in chronograms of FIG. 4, receive flag rx_flag can now be sent back to sub-assembly 200 for controlling transmit speed of sub-assembly 200 that will be able to transmit again only when the change of state is reflected within the loop comprised of elements 251, 252, 253, 206, 207, 204 and 205.

Such a system is certainly more advantageous than the first system that was previously described because data loss is no longer to be feared. On the other hand, it still does not make it possible to increase data transmission speed.

BRIEF SUMMARY OF THE INVENTION

An embodiment of the present invention provides data transmission between two asynchronous systems operating at high operational speeds.

One embodiment of the present invention is directed to a device for transferring data between two asynchronous systems communicating via a buffer memory, for example a FIFO memory, a register bank, or a dual port memory (a read port and a write port). The first system comprises a write pointer register and the second system comprises a read pointer register, both connected to the FIFO memory. Each pointer register is associated with a primary shadow register and a secondary shadow register. The primary shadow is located in the same sub-assembly as the pointer register with which it is associated, and episodically receives a copy of this pointer register. The secondary shadow is located in the other sub-assembly, and episodically receives a copy of the primary shadow register. Thus, each system has its own pointer register, the associated primary shadow, and the secondary shadow associated with the pointer register of the other system.

The secondary shadow registers are updated by a handshake mechanism working with the primary shadow registers. The use of four shadow registers makes it possible not to slow down the information stream the handshake mechanism operates.

Preferably, a similar handshake mechanism is used to control transfers in the shadow registers.

BRIEF DESCRIPTION OF THE SEVERAL VIEWS OF THE DRAWINGS

Other features, objects and advantages of the invention will appear when reading the following description and drawings, only given by way of nonrestrictive examples, where.

DETAILED DESCRIPTION OF THE INVENTION

Figure 5:
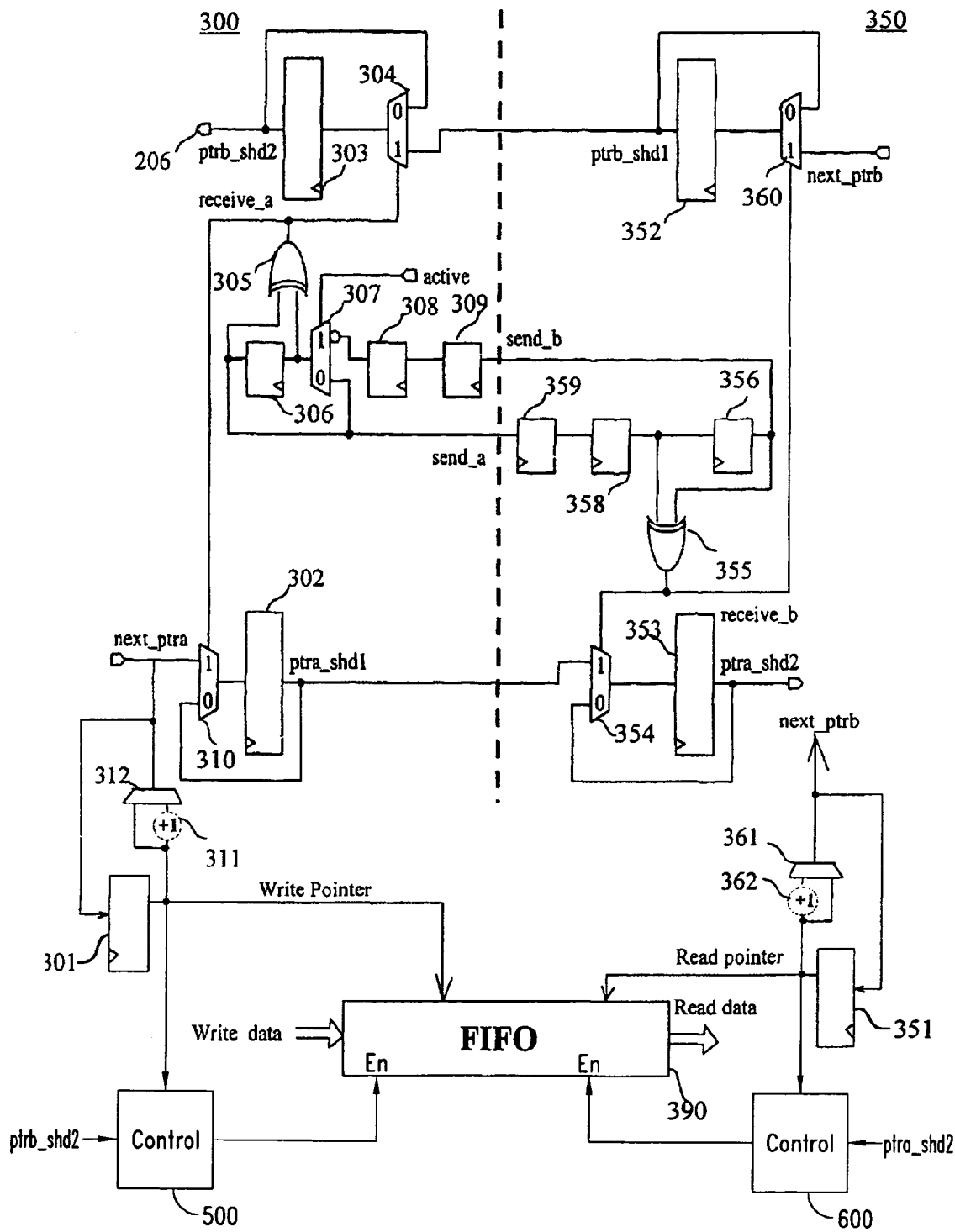
FIG. 5 illustrates a system according to one embodiment of the invention.

FIG. 5 illustrates a preferred embodiment of the invention. A buffer 390 is arranged to allow transmission between two asynchronous subsystems. Memory 390 is typically a FIFO-type (First In First Out) memory 390 or any operationally equivalent element such as for example a register bank, etc., located on the data path separating two asynchronous subsystems 300 and 350 clock-actuated by two separate clocks clka and clkb. Preferably, FIFO memory will be carried out by means of a dual port memory having a write port and a read port each operating with a separate clock (clka and clkb).

Moreover, in both subsystems 300 and 350, first and second pointer registers 301 and 351 are found that contain the write pointer and read pointer of the next memory cell, respectively.

In order to avoid any data transfer error, the device is designed to prevent receive sub-assembly 350 from reading data before transmit sub-assembly 300 (property PR1). Conversely, transmit sub-assembly 300 should not write in FIFO memory with an advance greater than the depth of the FIFO memory in the receive sub-assembly 350 (property PR2). Non-observance of property PR1 would lead to the appearance of invalid data in the datastream flowing between the subsystems, while non-observance of property PR2 would involve the disappearance of data from the data stream flowing between the subsystems.

In order to satisfy properties PR1 and PR2, two distinct sets of shadow registers are used in combination, respectively a set of primary shadow registers and a set of secondary shadow registers.

The set of primary shadow registers comprises a first register 302 (ptra_shd1) and a second register 352 (ptrb_shd1) that are respectively located in subsystem 300 and in subsystem 350. The first shadow register 302 stores a copy of the contents of the write pointer register (Write) 301 located in subsystem 300, while the second shadow register 352 stores a copy of the contents of the read pointer register 351 located in the same receiver subsystem.

The set of secondary shadow registers comprises a third register 303 (ptrb_shd2) and a fourth register 353 (ptra_shd2) that are respectively located in transmit subsystem 300 and in receive subsystem 350. Shadow register 303 stores a copy of the contents of the shadow register 352 located in the other subsystem. Similarly, shadow register 353 stores a copy of the contents of the shadow register 302 located in subsystem 300.

Thus, each subsystem has a secondary shadow register (303 for the transmit subsystem 300; 353 for receive subsystem 350) containing a copy of the other subsystem's pointer register.

The circuit further comprises a control block 500 for comparing the contents of write pointer register 301 with the contents of secondary shadow register 303 in order to enable writes in said FIFO memory by means of a control signal (Enable). Similarly, a control block 600 in receive system 350 makes it possible to compare the contents of read pointer register 351 with the contents of secondary shadow register 353 in order to enable reads from said FIFO memory.

Thus, by comparing this secondary shadow register with its own pointer register, each subsystem can evaluate the FIFO memory's filling level. Such evaluation is generally erroneous, since pointer registers cannot be directly compared; but it is sufficient to guarantee that properties PR1 and PR2 are respected. Indeed:

the write pointer secondary shadow register 353 cannot be ahead of write pointer register 301. Thus, by comparing secondary shadow register 353 with read pointer 351, the read subsystem cannot over-estimate the filling of the FIFO memory, which guarantees the respect of property PR1.

the read pointer secondary shadow register 303 cannot be ahead of read pointer 351. Thus, by comparing secondary shadow register 303 with write pointer register 301, the write subsystem cannot underestimate the filling of the FIFO memory, which guarantees the respect of property PR2.

Referring again to FIG. 5 it can be noted that, on the transmission side, write pointer register 301 of the FIFO memory has an output connected to a first input of a multiplexer 312, which multiplexer has a second input receiving the output of an increment circuit 311. Multiplexer 312 outputs the next value of the write address in FIFO memory and this value is transmitted to the input of register 301 and to a first input of a multiplexer 310 whose second input receives the output of the first shadow register 302 (ptra_shd1).

Symmetrically, on the reception side, read pointer register 351 has an output connected to a multiplexer 361 that also receives the output of an increment circuit 362. Multiplexer 361 outputs the next value of the read address in FIFO memory 390 and this value is transmitted to the input of register 351 and to a first input of a multiplexer 360 whose second input receives the output of the second shadow register 352 (ptrb_shd1).

The output of the first shadow register 302 (ptra_shd1) is connected to a first input of a multiplexer 354, which has a second input connected to the output of the fourth shadow register 353 (ptra_shd2). In the same manner, the output of the second shadow register 352 (ptrb-shd1) is connected to a first input of a multiplexer 304, which has a second input connected to the output of the third shadow register 303 (ptrb_shd2).

A handshake circuit is used to control transfer of the contents of said write pointer register 301 to said first shadow register 302, then to said fourth shadow register 353. In a particular embodiment, this handshake circuit is also used to control transfer of the contents of said write pointer register 301 to said first shadow register 302, then to said fourth shadow register 353.

The handshake circuit comprises a first XOR 355 and a second XOR 305, combined with a set of registers 306–309 and 356–359 combined in turn with an inverter element, the assembly comprising an astable loop.

More particularly, referring again to FIG. 5, it can be seen that the first XOR 355 has a first input connected to the output of a flip-flop 356 generating a first flag send_b. XOR 355 further has a second input connected to the output of a flip-flop 358 and to the input of flip-flop 356. Flip-flop 358 is assembled in cascade with a flip-flop 359 that receives a second flag, send_a, generated by subsystem 300.

In subsystem 300, the second XOR 305 has a first input connected to the output of a flip-flop 306 generating flag send_a, and a second input connected to the output of a multiplexer 307 and to the input of flip-flop 306. Multiplexer 307 has a first input (0) receiving flag send_a and a second inverter input connected to the output of a flip-flop 308 assembled in cascade with a flip-flop 309, and the input of flip-flop 309 receives the first flag send_b. Multiplexer 307 is controlled by a signal ACTIVE, which makes it possible to enable or disable activation of the handshake mechanism.

Clearly, the total number of flip-flops or register elements used in the astable loop can be modified. Thus, registers 309 and 359 could be removed if necessary. The existence of a shift register composed of a certain number of flip-flops (at least two flip-flops), and the existence of inverter multiplexer 307 ensures the astable nature of the loop formed by elements 306–309 and 356–359. Moreover, as shown in FIG. 5, the handshake mechanism is advantageously realized by means of a single loop. Alternatively, two distinct loops could be used to generate signals RECEIVE_a and RECEIVE_b.

A correct operation of the handshake mechanism is based on the three following properties:

Any data transmitted by a handshake mechanism should be stable during a transmit cycle, i.e., between a first switching of the transmit flag and the next switching of the receive flag (property PR3).

The pointer registers can be incremented during a transmit cycle (property PR4). This allows storing of new data in the FIFO memory, and/or reading of new data from the FIFO memory, even during shadow register updates. This property makes it possible to guarantee a high data flow.

In the event that reads and writes stop, after a predetermined time, the secondary shadow registers are set to the same value as the pointer registers with which they are associated (property PR5). This makes it possible to guarantee that any data written in FIFO memory can be read.

Properties PR3 and PR4 could not be satisfied if secondary shadow registers 303 and 353 were updated directly from pointer registers 351 and 301. The circuit of FIG. 5 first copies each pointer register in a primary shadow register (351 in 352, 301 in 302). Such copying is realized only at the beginning of a handshake mechanism's cycle, through multiplexers 304 and 354 controlled by signals receive_a and receive_b, respectively. The value of each primary shadow register can then be transmitted to the other subsystem to be stored in the secondary shadow register.

A single handshake mechanism is used for updating the secondary shadow registers. Signal send_a is at the same time a transmit flag for the write subsystem and a receive flag for the read subsystem. Reciprocally, signal send_b is at the same time a transmit flag for the read subsystem and a receive flag for the write subsystem.

Property PR5 is satisfied as long as the signal ACTIVE is set to value 1. Then, the secondary shadow register update cycles follow one another without any interruption.

Figure 1:
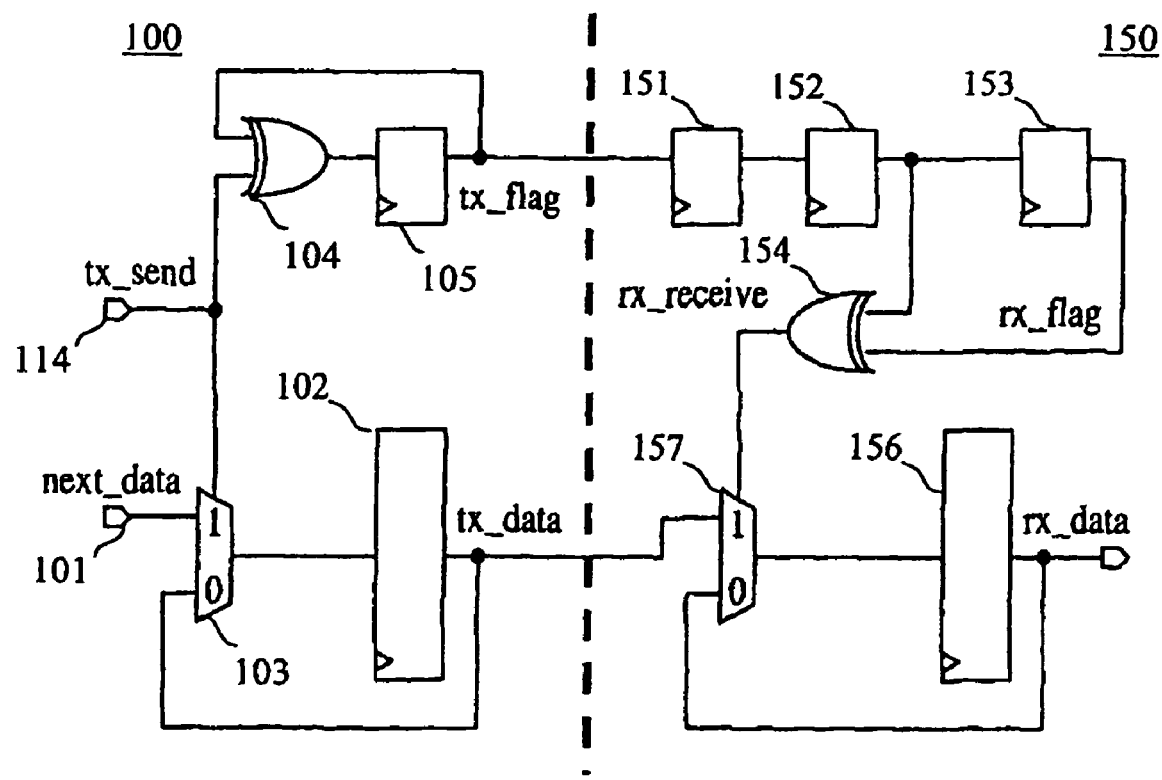
FIG. 1 illustrates a first known transmission circuit.
Figure 2:
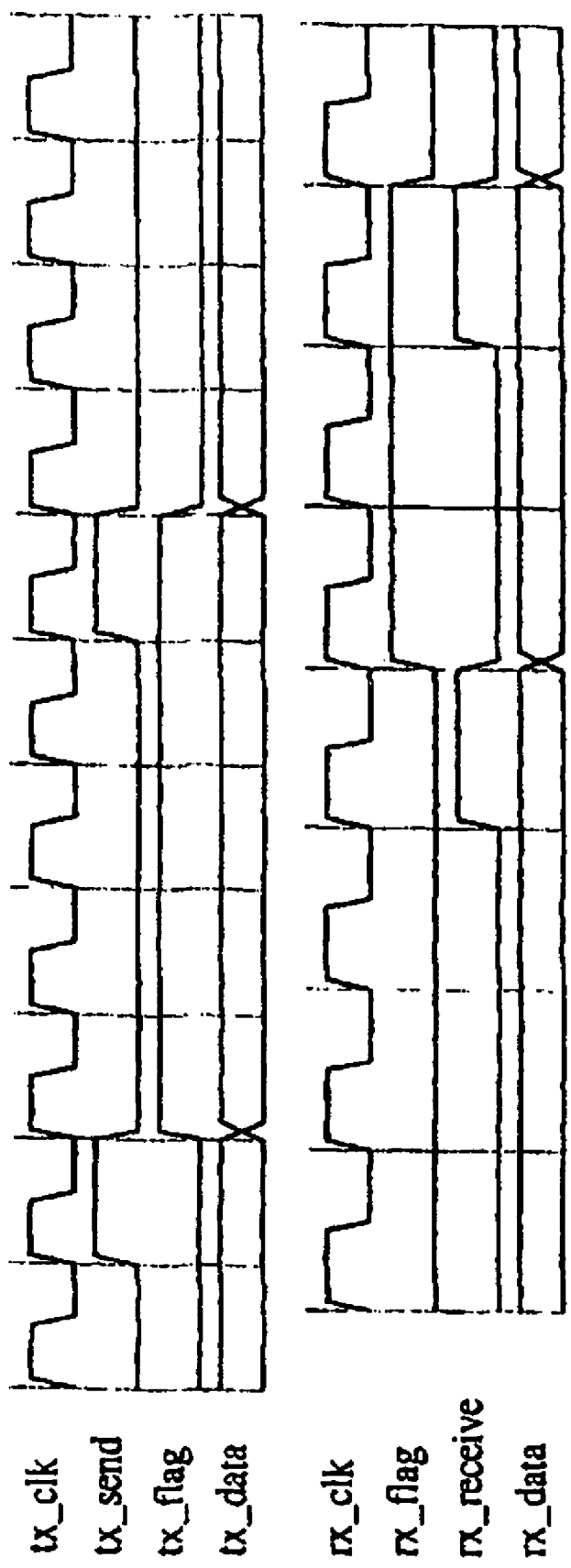
FIG. 2 illustrates chronograms representative of the first known circuit.
Figure 3:
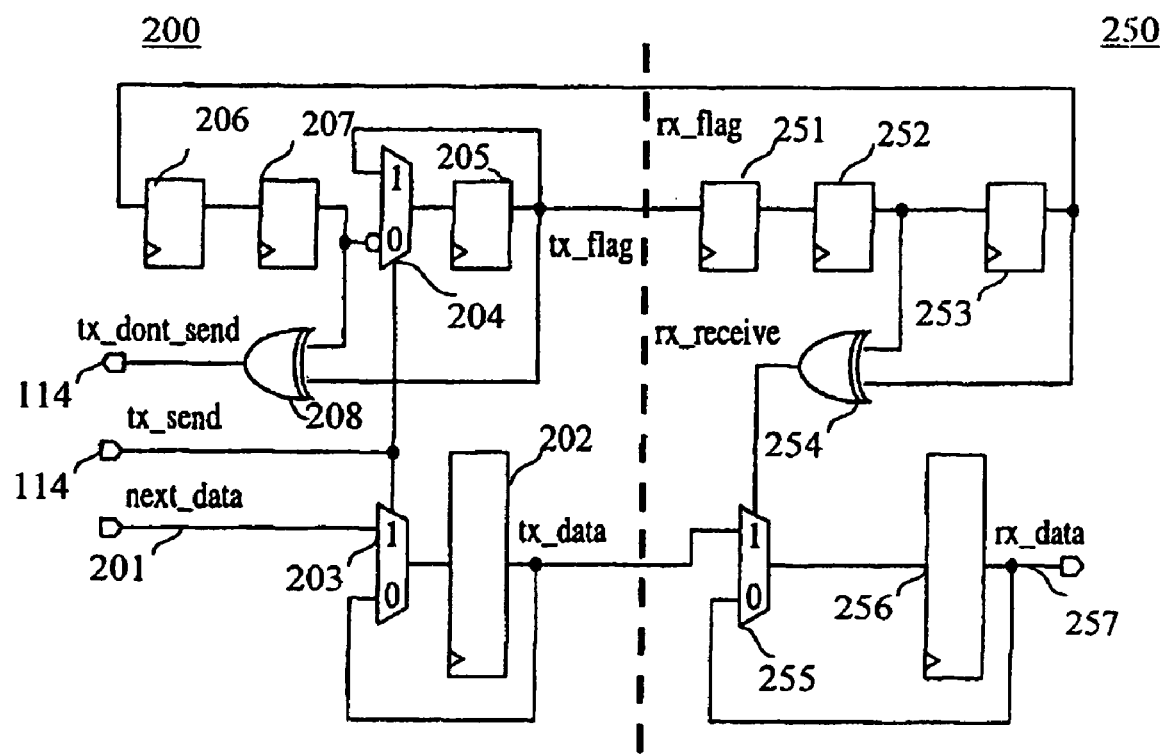
FIG. 3 illustrates a second known transmission circuit.
Figure 4:
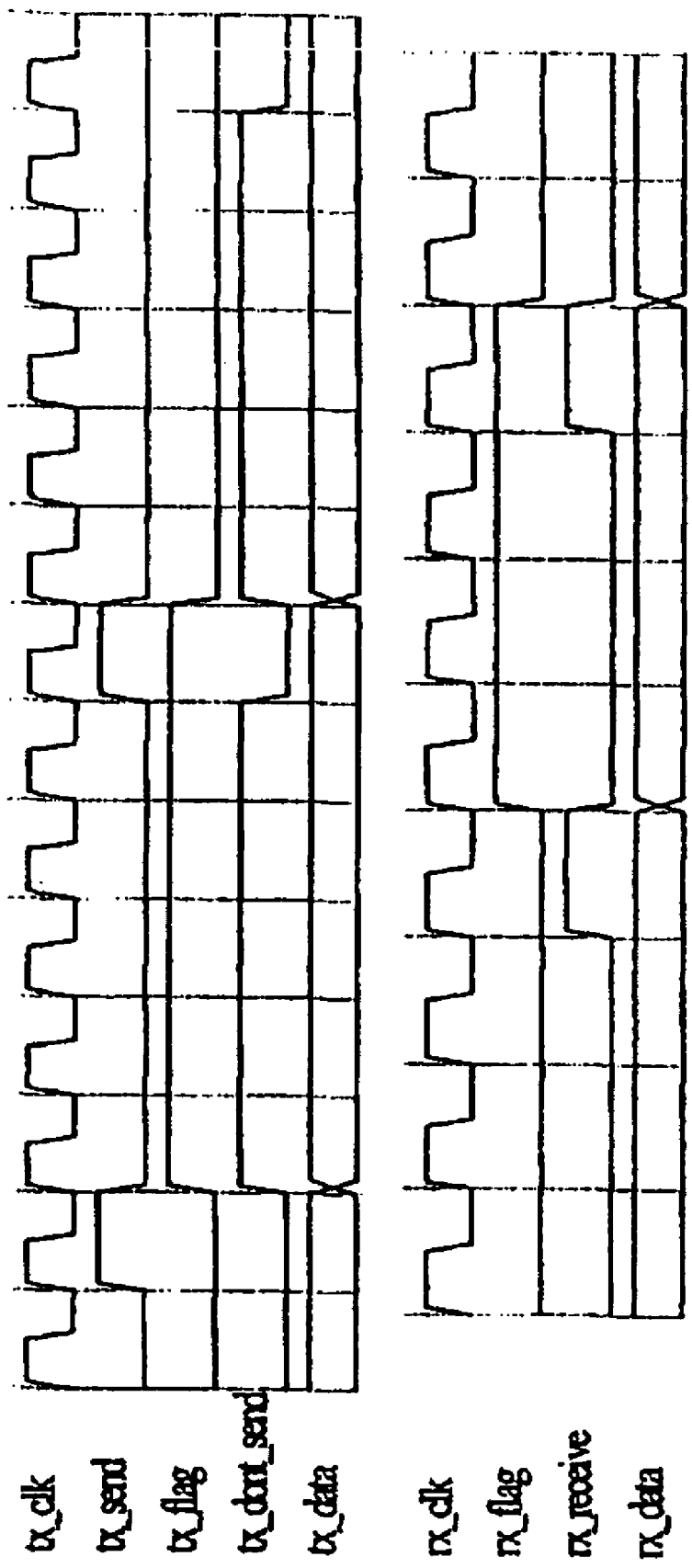
FIG. 4 illustrates chronograms representative of the operation of the second known system.

Contrary to the techniques taught by prior art, in which generation of data had to wait for a complete flag rotation cycle, the circuit of FIG. 3 authorizes a sudden loading of the FIFO independently of the rotation of the flag. Thus, it can be noted that as long as the FIFO memory is not full, subsystem 300 can write values in subsystem 300 and, conversely, as long as the FIFO memory is not empty, subsystem 350 can read data therein. Thus, effective data transfer between two perfectly asynchronous systems is obtained.

A detailed description of the operation of the circuit of FIG. 5 will now be given. Let us suppose that FIFO memory 390 is empty and that the primary shadow registers 302 and 350 and the secondary shadow registers, respectively located in systems 353 and 303, contain the same values. One also supposes that control signal ACTIVE is activated in order to enable the circulation of the dual flag within on the astable loop.

When a data is presented to the access bus to FIFO 390, register 301 contains the value of the write pointer where this data must be stored. The contents of register 301 and the contents of secondary shadow register 303 are compared in order to check for cell availability within FIFO 390. If the comparison succeeds—as is the case in our assumption in which FIFO memory 390 is supposed to be empty—writing is then authorized by circuit 500 activating the ENABLE signal of the FIFO and, within the same clock cycle, the write register 301 is incremented by means of elements 311 and 312.

This incremented value is presented to the input of multiplexer 310, but the transfer into the primary shadow register 302 associated with register 301 only occurs under control of the flag loop. Such transfer is assured when both inputs of XOR 305 have different values, which is the case when switching within the loop reaches the level of element 306. At that time, during a cycle of the clock of transmit circuit 300, XOR gate 305 controls both multiplexers 304 and 310, which causes registers 352 and 301 to be copied to secondary register 303 and primary shadow register 302 of the transmit circuit, respectively.

Consequently, primary shadow register 302 and secondary shadow register 303 are loaded with a data which is lower than or equal to the real contents of the registers of which they are the copy, namely write register 301 and shadow register 352, whose contents is in turn lower than or equal to the value stored in read pointer register 351. Thus, when transmit circuit 300 compares between the contents of register 303 and register 301, it is guaranteed that the mechanism sees the FIFO as being more loaded than it really is and, consequently, overwriting data not yet read is not to be feared. Property PR1 is then always satisfied.

When the flag circulates within the handshake loop, composed by flip-flops 306–309 and 356–359 and reverser multiplexer circuit 309, it can be noted that, at one point it reaches element 356 and, during one clock cycle of the read circuit 350, the inputs of XOR 355 are opposite. Thus, for one cycle of the receive circuit 300 the XOR circuit generates an active signal (RECEIVE_b) that controls both multiplexers 354 and 360 then, a second flag SEND_b is generated at the next clock edge.

Control signal RECEIVE_b causes registers 351 and 302 to be copied in shadow registers 352 and 353, respectively. As a result primary shadow register 352 receives an update of the contents of read pointer 361 and secondary shadow register 353 receives an update of the contents of primary shadow register 302.

Two clock cycles of system 300 after the generation of signal SEND_B, signal SEND_B is received and reversed by multiplexer 307 in order to cause the flag to switch and the XOR 305 to output the control signal.

Thus, it can be noted that signals RECEIVE_A and RECEIVE_B are generated alternatively, allowing the realization of a handshake mechanism by means of a single shift loop associated with multiplexer 307. Thus, on every cycle of the handshake loop, the secondary shadow registers periodically receive an update of the contents of the read and write pointers. This update is used to control read operations and write operations in FIFO 390, respectively. In this manner, one is ensured not to lose data in the FIFO by overwriting data that have not been read yet and, conversely, generating erroneous data while reading the FIFO, because of cells that would not have been loaded with valid data, is prevented.

Thus, the FIFO memory can be completely loaded until write register 301 catches up with the value of secondary shadow register 303 containing the last updated value of read register 351. Thus, a particularly effective mechanism between two completely asynchronous systems is obtained.

Let us suppose now that FIFO 390 is read by receive system 350 and that there is no write operation. It is noted that this FIFO can be read until read register 351 catches up with the value stored in secondary shadow register 353, in which case the process is inhibited by circuit 600 disable control signal ENABLE, until occurrence of new write operations associated with incrementing of write counter then transmitted to secondary shadow register 353.

It can be noted that read and write operations in FIFO memory 390 can be carried out indifferently, in a completely asynchronous way, while guarantying neither to lose any data nor to generate erroneous data.

Figure 6:
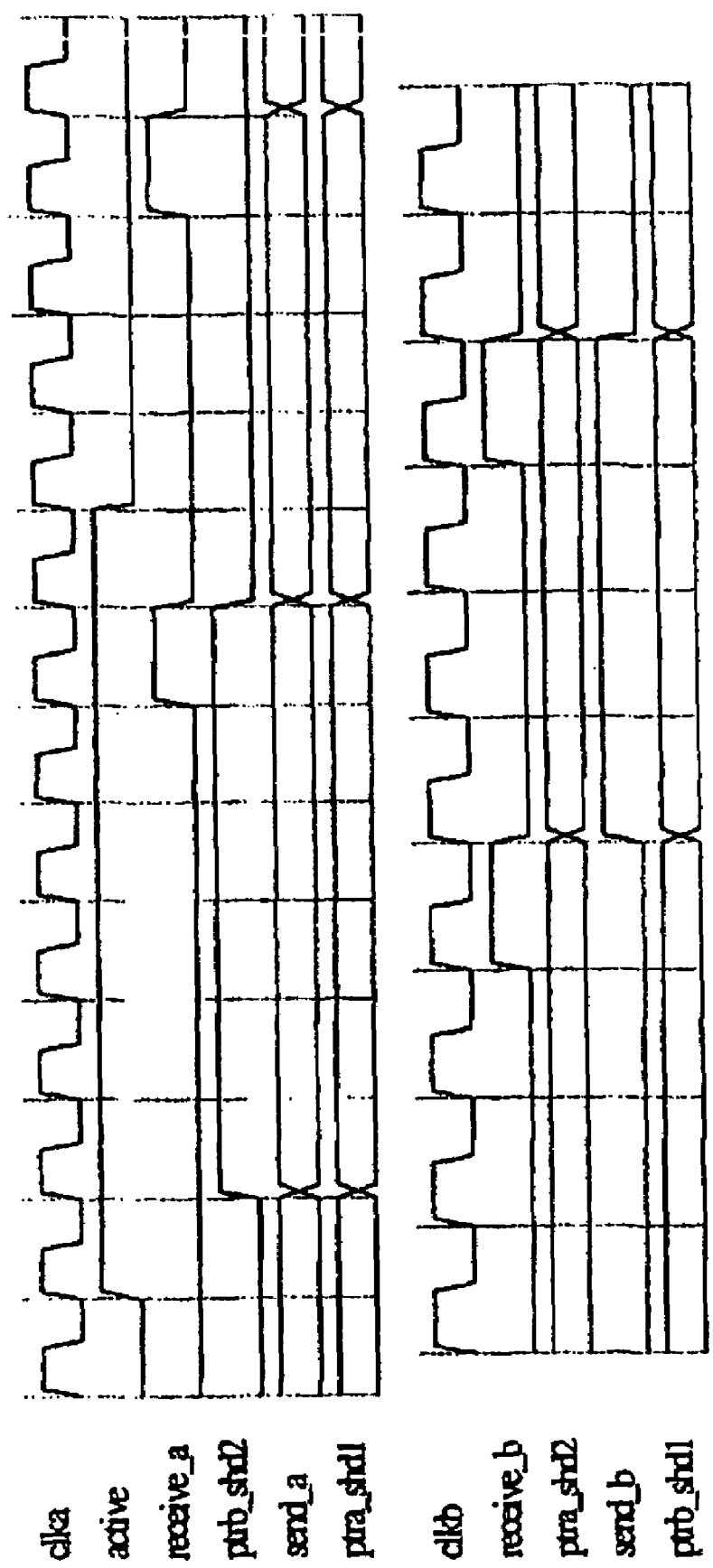
FIG. 6 illustrates chronograms representative of the operation of the circuit according to the invention.

Chronograms illustrating the operation of the circuit of FIG. 5 are represented in FIG. 6, and in particular signals clka, activate, receive_a, ptrb_shd2, send_a, ptra_shd1, clkb, receive_b, ptra_shd2, send_b, ptrb_shd1.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A device for transferring data between asynchronous first and second systems, comprising:
    a write pointer register in the first system for writing data;
    a read pointer register in a second system for reading data;
    a buffer memory connected between the first and second systems;
    a first shadow register located in the first system and connected to the write pointer register to receive contents of the write pointer register;
    a second shadow register located in the second system and connected to the read pointer register to receive contents of the read pointer register;
    a third shadow register located in the first system and connected to the second shadow register to receive contents of the second shadow register; and
    a first compare circuit comparing the contents of the write pointer register with the contents of the third shadow register in order to authorize writes to the buffer memory.

2. The device of claim 1, further comprising:
    a fourth shadow register located in the second system and connected to the first shadow register to receive contents of the first shadow register; and
    a handshake circuit controlling successively the transfer of the contents of the write pointer register to the first shadow register, then to the fourth shadow register.

3. The device of claim 2 wherein the handshake circuit comprises a loop of registers or flip-flops combined with a reverser element in order to allow the circulation of a switching state on the loop, the state being used successively as a flag for the first system and a flag for the second system.

4. The device of claim 2 wherein the handshake circuit comprises:
    a first multiplexer having first and second inputs and an output;
    a first flip-flop having an input connected to the output of the first multiplexer and an output generating a first flag that is transmitted to the second system;
    a first logic gate having a first input connected to the output of the first flip-flop, a second input connected to the output of the first multiplexer, and an output;
    a second flip-flop having an input connected to the output of the first flip-flop and an output generating a second flag that is transmitted to the first system and
    a second logic gate having a first input connected to the output of the first flip-flop, a second input connected to the output of the second flip-flop, and an output that controls the transfer of the contents of the first shadow register to the fourth shadow register and controls the transfer of the contents of the read pointer register to the second shadow register.

5. The device of claim 4 wherein the first system comprises:
    a second multiplexer controlled by the first logic gate and allowing transfer between the second shadow register and the third shadow register; and
    a third multiplexer allowing transfers between the write pointer register and the first shadow register.

6. The device of claim 5 wherein the second system comprises:
    a fourth multiplexer connected to the output of the second logic gate and allowing transfer between the first shadow register and the fourth shadow register; and
    a fifth multiplexer connected to the output of the second logic gate and allowing transfers between the read pointer register and the second shadow register.

7. The device of claim 4 wherein the handshake circuit further comprises:
    a third flip-flop having an input and an output, the input being connected to the output of the second flip-flop;
    a fourth flip-flop having an input connected to the output of the third flip-flop, and an output connected to the first input of the first multiplexer;
    a fifth flip-flop having an input and an output, the input being connected to the output of the first flip-flop; and
    a sixth flip-flop having an input connected to the output of the fifth flip-flop and an output connected to the input of the second flip-flop.

8. The device of claim 1 wherein the buffer memory is a FIFO memory realized by a dual port memory.

9. The device of claim 1 wherein the first and second systems are integrated in the same semiconductor product.

10. A method of transferring data between asynchronous first and second systems, the first system including a write pointer register and the second system including a read pointer register, the method comprising:
    transmitting contents of the write pointer register into a first shadow register in the first system;
    transmitting contents of the read pointer register into a second shadow register in the second system;
    transmitting contents of the second shadow register into a third shadow register in the first system;
    comparing the contents of the write pointer register with the contents of the third shadow register; and authorizing writes to a buffer memory connected between the first and second systems based on results of the comparing step.

11. The method of claim 10, further comprising:
creating a first flag that controls the step of transmitting the contents of the read pointer register into the second shadow register;
inverting the first flag to create a second flag that controls the steps of transmitting the contents of the write pointer register into the first shadow register and transmitting the contents of the second shadow register into the third shadow register.

12. The method of claim 11, further comprising:
transmitting contents of the first shadow register into a fourth shadow register in the second system; and
controlling, using the first flag, the step of transmitting the contents of the first shadow register into the fourth shadow register.

13. The device of claim 1, further comprising:
a fourth shadow register located in said second system and connected to said first shadow register to receive contents of said first shadow register; and
a second compare circuit comparing of the contents of said read pointer register with the contents of said fourth shadow register in order to authorize reads in said buffer memory.

14. The device of claim 13, further comprising a handshake circuit controlling successively the transfer of the contents of said read pointer register to said second shadow register, then to said third shadow register.

15. The device of claim 14 wherein said handshake circuit comprises a loop of registers or flip-flops combined with a reverser element in order to allow the circulation of a switching state on the loop, said state being used successively as a flag for said first system and a flag for said second receive system.

16. The device of claim 15 wherein, in said first system, said handshake circuit comprises:
a first flip-flop having an input and an output, said input receiving the flag of the second system;
a second flip-flop having an input and an output, said input receiving the output of said first flip-flop;
a first multiplexer having a first reverser input connected to the output of said second flip-flop and a second non-reverser input receiving the flag transmitted to the second system;
a third flip-flop having an input connected to said output of said multiplexer and an output generating said flag transmitted to the second system; and
a first XOR gate having a first input connected to the output of said third flip-flop and a second input connected to the output of said multiplexer.

17. The device of claim 16 wherein said first system comprises:
a second multiplexer controlled by said first XOR gate and allowing transfer between said second shadow register and said third shadow register; and
a third multiplexer allowing transfers between said write pointer register and said first shadow register.

18. The device of claim 16 wherein, in said second system, said handshake circuit comprises:
a fourth flip-flop having an input and an output, said input receiving the flag of said first system;
a fifth flip-flop having an input and an output, said input receiving the output of said fourth flip-flop;
a sixth flip-flop having an input connected to said output of said fifth flip-flop and an output generating the flag transmitted to said first system; and
a second XOR gate having a first input connected to the output of said fifth flip-flop and a second input connected to the output of said sixth flip-flop.

19. The device of claim 18 wherein said second system comprises:
a second multiplexer controlled by said second XOR gate and allowing transfer between said first shadow register and said fourth shadow register; and
a third multiplexer allowing transfers between said read pointer register and said second shadow register.

20. A device for transferring data between asynchronous first and second systems, comprising:
a write pointer register in the first system for writing data;
a read pointer register in a second system for reading data;
a buffer memory connected between the first and second systems;
a first shadow register located in the first system and connected to the write pointer register to receive contents of the write pointer register;
a second shadow register located in the second system and connected to the read pointer register to receive contents of the read pointer register;
a third shadow register located in the first system and connected to the second shadow register to receive contents of the second shadow register; and
a fourth shadow register located in the second system and connected to the first shadow register to receive contents of the first shadow register; and
a handshake circuit controlling successively the transfer of the contents of the write pointer register to the first shadow register, then to the fourth shadow register, wherein the handshake circuit comprises a loop of registers or flip-flops combined with a reverser element in order to allow the circulation of a switching state on the loop, the state being used successively as a flag for the first system and a flag for the second system.

21. The device of claim 20 wherein the handshake circuit comprises:
a first multiplexer having first and second inputs and an output;
a first flip-flop having an input connected to the output of the first multiplexer and an output generating a first flag that is transmitted to the second system;
a first logic gate having a first input connected to the output of the first flip-flop, a second input connected to the output of the first multiplexer, and an output;
a second flip-flop having an input connected to the output of the first flip-flop and an output generating a second flag that is transmitted to the first system and
a second logic gate having a first input connected to the output of the first flip-flop, a second input connected to the output of the second flip-flop, and an output that controls the transfer of the contents of the first shadow register to the fourth shadow register and controls the transfer of the contents of the read pointer register to the second shadow register.

22. The device of claim 21 wherein the first system comprises:
a second multiplexer controlled by the first logic gate and allowing transfer between the second shadow register and the third shadow register; and
a third multiplexer allowing transfers between the write pointer register and the first shadow register.

23. The device of claim 22 wherein the second system comprises:
a fourth multiplexer connected to the output of the second logic gate and allowing transfer between the first shadow register and the fourth shadow register; and
a fifth multiplexer connected to the output of the second logic gate and allowing transfers between the read pointer register and the second shadow register.

24. The device of claim 21 wherein the handshake circuit further comprises:
a third flip-flop having an input and an output, the input being connected to the output of the second flip-flop;
a fourth flip-flop having an input connected to the output of the third flip-flop, and an output connected to the first input of the first multiplexer;
a fifth flip-flop having an input and an output, the input being connected to the output of the first flip-flop; and
a sixth flip-flop having an input connected to the output of the fifth flip-flop and an output connected to the input of the second flip-flop.

* * * * *